US006969549B1

(12) United States Patent
Zamani-Kord et al.

(10) Patent No.: US 6,969,549 B1
(45) Date of Patent: Nov. 29, 2005

(54) TECHNIQUES TO PREVENT LEAKAGE OF FLUORESCING SIGNALS THROUGH PRINT MEDIA OR INDICIA TAPE

(75) Inventors: Said Zamani-Kord, San Diego, CA (US); Dale R. Davis, Poway, CA (US); Craig S. Huston, Bayside, CA (US); Bruce E. Mortland, Oceanside, CA (US); Kenneth J. Knight, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/443,401

(22) Filed: Nov. 19, 1999

(51) Int. Cl.[7] .............................................. B32B 27/14
(52) U.S. Cl. .................. 428/195.1; 428/913; 428/690; 428/481; 428/209; 283/92; 283/110; 235/491; 235/462.05; 235/493
(58) Field of Search ................................ 428/195, 913, 428/690, 481, 209; 283/92, 110; 235/491, 235/462.05, 493

(56) References Cited

U.S. PATENT DOCUMENTS

| | | | | |
|---|---|---|---|---|
| 3,519,124 A | | 7/1970 | Barker et al. | 206/57 |
| 3,618,752 A | | 11/1971 | Barker et al. | 206/57 |
| 3,944,710 A | | 3/1976 | Parent | 428/412 |
| 3,949,148 A | | 4/1976 | Akman | 428/500 |
| 4,051,285 A | | 9/1977 | Kramer | 428/43 |
| 4,188,139 A | | 2/1980 | Pasini et al. | 400/696 |
| 4,243,694 A | * | 1/1981 | Mansukhani | 427/14.1 |
| 4,529,688 A | | 7/1985 | Law et al. | 430/494 |
| 4,533,926 A | | 8/1985 | Foldvari et al. | 346/136 |
| 4,721,058 A | | 1/1988 | Hayamizu et al. | 118/665 |
| 4,780,391 A | * | 10/1988 | Hiraishi et al. | 430/138 |
| 4,782,365 A | | 11/1988 | Takagi | 355/38 |
| 4,788,563 A | | 11/1988 | Omo et al. | 346/140 R |
| 4,816,386 A | | 3/1989 | Gotoh et al. | 430/495 |
| 4,864,324 A | | 9/1989 | Shirota et al. | 346/1.1 |
| 5,093,147 A | | 3/1992 | Andrus et al. | 427/7 |
| 5,123,960 A | | 6/1992 | Shirota et al. | 106/22 |
| 5,130,726 A | | 7/1992 | Fukushima et al. | 346/140 |
| 5,138,463 A | | 8/1992 | Morimoto et al. | 358/296 |
| 5,146,087 A | | 9/1992 | VanDusen | 250/271 |
| 5,282,894 A | | 2/1994 | Albert et al. | 106/22 D |
| 5,296,023 A | | 3/1994 | Gregory et al. | 106/22 D |
| 5,301,044 A | | 4/1994 | Wright | 358/500 |
| 5,336,714 A | | 8/1994 | Krutak et al. | 524/608 |
| 5,348,348 A | | 9/1994 | Hanada et al. | 283/91 |
| 5,366,252 A | * | 11/1994 | Nishida et al. | 283/94 |
| 5,422,659 A | | 6/1995 | Titterington et al. | 347/101 |
| 5,467,119 A | | 11/1995 | Richtsmeier et al. | 734/102 |
| 5,492,370 A | * | 2/1996 | Chatwin et al. | 283/110 |
| 5,528,154 A | | 6/1996 | Leichner et al. | 324/693 |

(Continued)

*Primary Examiner*—Rena Dye
*Assistant Examiner*—Tamra L. Dicus

(57) ABSTRACT

A substrate structure encoded with information bearing indicia includes a substrate having a first surface and a second surface. Formed on the first surface is a first information bearing indicia defined by a fluorescent material. A second information bearing indicia is defined by a fluorescent material positioned adjacent to the second surface, the second indicia and the first indicia in an overlapping relationship. The substrate structure includes apparatus for preventing interference between the first indicia and the second indicia during a detection process. The interference preventing apparatus can include reflective or absorptive coatings formed on the first and second surfaces of the substrate, the first and second information bearing indicia positioned on the respective reflective coatings, a thin metal foil layer positioned between the first indicia and the second indicia, or a black background disposed between the first and second indicia.

14 Claims, 6 Drawing Sheets

U.S. PATENT DOCUMENTS

| | | | | | |
|---|---|---|---|---|---|
| 5,542,972 | A | | 8/1996 | von der Eltz et al. | 106/22 H |
| 5,554,842 | A | | 9/1996 | Connell et al. | |
| 5,563,401 | A | | 10/1996 | Lemelson | 235/494 |
| 5,573,831 | A | * | 11/1996 | Suzuki et al. | 428/64.1 |
| 5,614,008 | A | | 3/1997 | Escano et al. | 106/23 D |
| 5,679,115 | A | | 10/1997 | Fritzsche et al. | 8/444 |
| 5,684,069 | A | | 11/1997 | Auslander | 524/88 |
| 5,686,725 | A | | 11/1997 | Maruyama et al. | 250/271 |
| 5,698,839 | A | * | 12/1997 | Jagielinski et al. | 235/493 |
| 5,701,547 | A | | 12/1997 | Yamada et al. | 399/1 |
| 5,702,511 | A | | 12/1997 | de Saint-Romain et al. | 106/31.32 |
| 5,723,202 | A | * | 3/1998 | Mueller et al. | 428/32.14 |
| 5,781,708 | A | | 7/1998 | Austin et al. | 395/106 |
| 5,816,165 | A | | 10/1998 | Huston | 101/490 |
| 5,852,745 | A | | 12/1998 | Fontal et al. | 395/835 |
| 5,876,068 | A | * | 3/1999 | Schneider et al. | 283/86 |
| 5,879,775 | A | * | 3/1999 | Walter et al. | 428/76 |
| 6,089,614 | A | * | 7/2000 | Howland et al. | 283/91 |
| 6,097,497 | A | | 8/2000 | McGraw | |
| 6,117,509 | A | | 9/2000 | Lee | |
| 6,165,609 | A | * | 12/2000 | Curatolo | 250/365 |
| 6,214,449 | B1 | * | 4/2001 | Otani et al. | 428/218 |
| 6,245,711 | B1 | * | 6/2001 | Halbrook, Jr. | 503/206 |
| 6,386,671 | B1 | * | 5/2002 | Huston et al. | 347/16 |
| 6,471,247 | B1 | * | 10/2002 | Hardwick et al. | 283/72 |
| 6,471,248 | B2 | * | 10/2002 | Hardwick et al. | 283/72 |
| 6,714,288 | B2 | * | 3/2004 | Cohen | 356/71 |
| 6,766,953 | B1 | * | 7/2004 | Huston et al. | 235/462.05 |

* cited by examiner

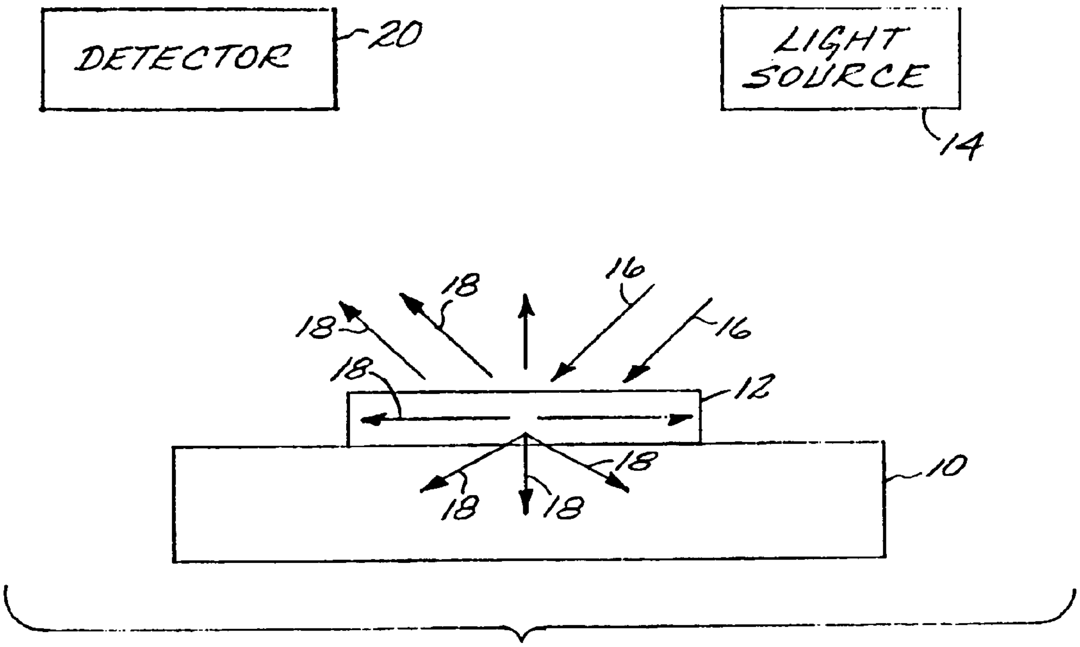
FIG. 1
FIG. 2
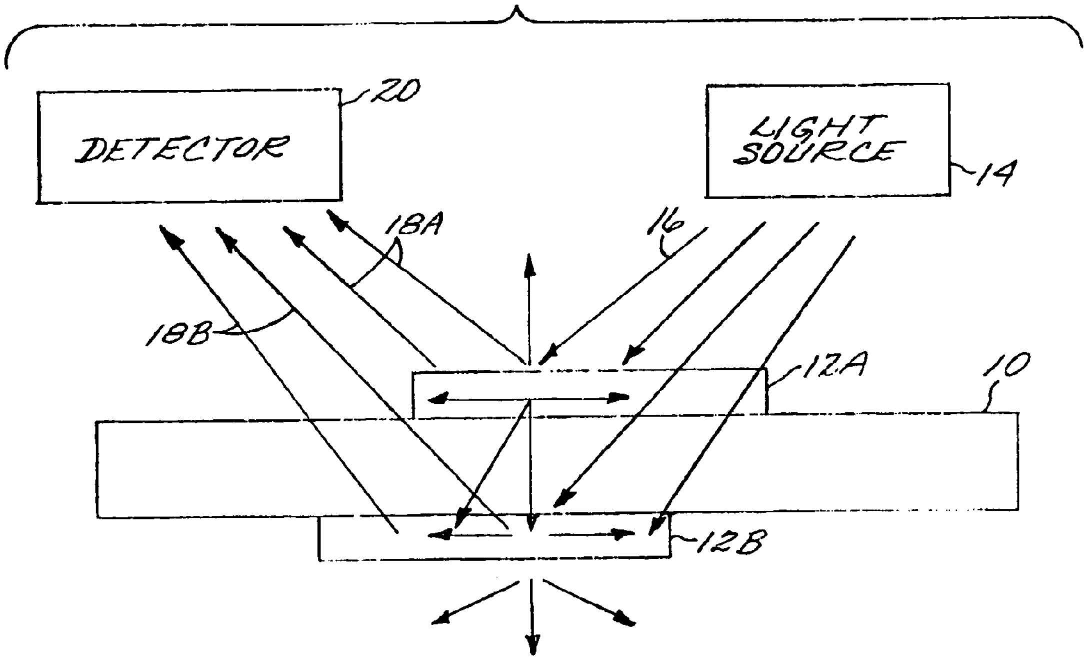

TECHNIQUES TO PREVENT LEAKAGE OF FLUORESCING SIGNALS THROUGH PRINT MEDIA OR INDICIA TAPE

CROSS-REFERENCE TO RELATED APPLICATIONS

This application is related to application Ser. No. 09/443,400, entitled TAPE INDICIA ON CLEAR FILM MEDIA, filed Nov. 19, 1999, and to application Ser. No. 09/328,543, filed Jun. 9, 1999, entitled SYSTEM AND METHOD FOR CONTROLLING AN IMAGE TRANSFER DEVICE, the entire contents of which applications are incorporated herein by this reference.

TECHNICAL FIELD OF THE INVENTION

This invention relates to print media, and more particularly to techniques for marking media with fluorescent indicia readable by an inkjet printer, copier, facsimile machine, large format printer or other printing mechanism.

BACKGROUND OF THE INVENTION

Fluorescing compounds are a class of dyes that are rapidly finding their way into ink formulation and many other commercial applications. One feature of these compounds in ink systems (or other systems) is their ability to convey information by fluorescing at the region of the electromagnetic spectrum between 200 and 1100 nanometers. The ink with a low concentration of dye, when printed, is invisible to normal vision. It is used to mark paper (and other media) with indicia containing information. Upon exposure to the radiation of a specific wavelength, the dye component of the ink fluoresces at some specific, higher wavelength. The emitting radiation can be interpreted by appropriate detection where the resulting signals reveal coded information.

FIG. 1 is a diagrammatic, not to scale view showing a fluorescing ink forming an indicia 12 on a sheet of paper or other print medium 10. An illumination light source 14 directs the excitation radiation 16 onto the ink indicia 12. The ink emits fluorescent radiation 18 in response to the excitation, which is detected by the detector 20.

Exemplary inks are described in co-pending application entitled LIGHT SENSITIVE INVISIBLE INK COMPOSITIONS AND METHODS FOR USING THE SAME, application Ser. No. 09/181,581, filed Oct. 28, 1998, the entire contents of which are incorporated herein by this reference. Exemplary systems for reading fluorescing ink indicia are described in co-pending application Ser. No. 09/181,589, filed Oct. 28, 1998, entitled INTEGRATED PRINTING/SCANNING SYSTEM USING INVISIBLE INK FOR DOCUMENT TRACKING.

It can be desirable to mark both sides of a sheet media with indicia. For example, marking both sides of a single sheet of media is useful on special ink jet media to determine media type, side to print on, media size, media orientation in the printer and other information. Such a print media indicia marking technique is described in above-referenced co-pending application TAPE INDICIA ON CLEAR FILM MEDIA. This application describes machine readable indicia formed on a tape applied to the leading edge or other locations of a clear or transparent print medium. In one example, indicia are placed on both sides of the tape.

When both sides of a sheet of media or an indicia-bearing tape as described in the above-referenced co-pending application are printed with fluorescing inks, reading from one side of the sheet can interfere with reading from the other side of the sheet. This occurs when the fluorescent radiation leaks through the sheet or tape from ink printed on the back of the sheet or tape. This is illustrated in FIG. 2, which shows respective indicia 12A and 12B applied on opposite sides of the sheet 10, emitting respective fluorescent radiation 18A and 18B which is detected by the detector 20. Since different information can be coded on each side of the sheet 10, the detector will receive scrambled information and thus there will be confusion during the decoding process.

The leakage of emitting fluorescing radiation through a print medium or indicia-bearing tape changes the signal to noise ratio, which in turn requires more ink or ink containing more dye. This increases the visibility of marks and the cost of ink. Using a more sensitive detector also increases the cost of the detection system.

It would be advantageous to prevent this kind of leakage. A further advantage would be to provide a coding system in which an indicia-bearing tape applied to a transparent medium such as an overhead transparency has indicia readable from each side without interference from the indicia on the other side.

It would also be an advantage to provide a means of placing indicia which can be read from a simple, inexpensive detector.

SUMMARY OF THE INVENTION

A substrate structure encoded with information bearing indicia is described, and includes a substrate having a first surface and a second surface. Formed on the first surface is a first information bearing indicia defined by a fluorescent material. A second information bearing indicia is defined by a fluorescent material positioned adjacent to the second surface, the second indicia and the first indicia in an overlapping relationship. In accordance with an aspect of the invention, the substrate structure further includes means for preventing interference between the first indicia and the second indicia during a detection process.

In a first embodiment, the interference preventing means includes reflective or absorptive coatings formed on the first and/or second surfaces of the substrate, the first and second information bearing indicia positioned on the respective reflective coatings, the coatings reflecting and/or absorbing the excitation energy as well as the fluorescing energy.

In another embodiment, the interference preventing means includes a thin metal foil layer positioned between the first indicia and the second indicia.

In a further exemplary embodiment, the interference preventing means includes a black background disposed between the first and second indicia.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 is a diagrammatic view showing a fluorescing ink forming an indicia on a print medium or indicia tape, with an illumination light source directing excitation radiation onto the ink indicia, and a detector for detecting radiation fluorescing from the ink.

FIG. 2 shows respective indicia applied on opposite sides of a print medium or indicia tape, emitting respective fluorescent radiation which are detected by the detector.

DETAILED DESCRIPTION OF THE PREFERRED EMBODIMENTS

Several exemplary techniques in accordance with the invention are described to prevent leakage of fluorescing signals of fluorescing dyes through a print or tape medium. FIGS. 3–7 illustrate techniques for preventing leakage through indicia-bearing tape materials, such as, for example, paper, polyester, polyethylene, polystyrene, which are then applied to a print medium, as illustrated in the referenced application, entitled TAPE INDICIA ON CLEAR FILM MEDIA. A first technique is to coat one or both sides of the tape with reflective or absorptive material(s). A second technique is to sandwich some reflective (or absorptive) material(s) between two layers of the tape to form a composite tape structure. A third exemplary technique is to place a black background under the indicia or between the first and second indicia. These exemplary techniques are now described in further detail.

One way to prevent radiation leakage is to coat one (or both) sides of the tape with some coating mixture that contains reflective or absorptive material(s), e.g., a white ink or coating mixture containing reflective material such as, Titanium (IV) Oxide ($TiO2$), Zinc Oxide ($ZnO$), Zirconium (IV) Oxide ($ZrO2$), aluminum oxide ($AlO3$), aluminum oxide hydroxide ($AlO(OH)$), aluminum trihydroxide ($Al(OH)3$), etc. Because of the reflective and/or absorptive nature of these materials, the fluorescing radiation is blocked and prevented from leakage. A typical coating mixture could be any combination of pigments (Alumina, Silica, etc.) and binders (polyvinyl alcohols, polyvinyl acetates, etc.), cellulosics materials (hydroxypropyl methyl cellulose, hydroxyethyl cellulose, etc.).

Figure 3:
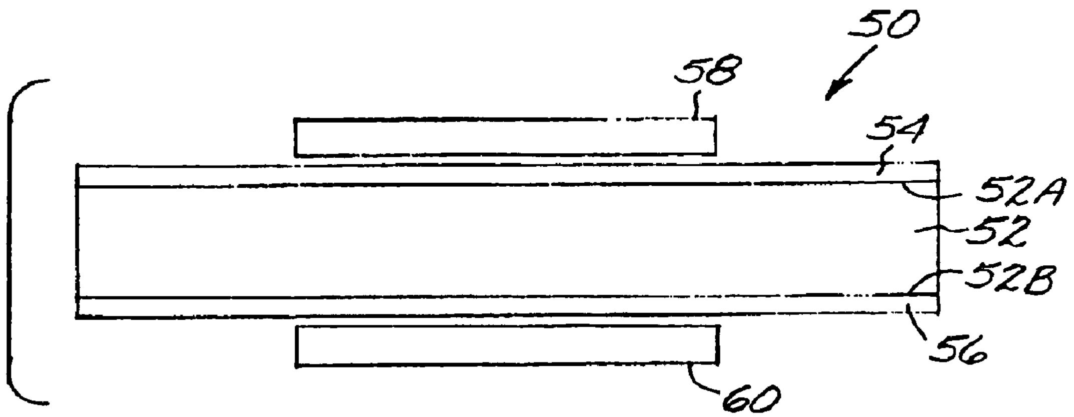
FIG. 3 is a diagrammatic side view of a print medium with indicia on both sides thereof, and employing a first embodiment of a radiation blocking technique in accordance with the invention.

An exemplary embodiment is illustrated in FIG. 3, wherein an indicia-bearing tape structure 50 includes a tape 50 has an upper surface 52A and a lower surface 52B. In an exemplary embodiment, the tape has a width of 0.5 cm to about 0.9 cm, although this dimension can vary depending on the application. A first reflective (or absorptive) layer 54 is placed on surface 52A. A second reflective (or absorptive) layer 56 is placed on surface 52B. The layers 54 and 56 can comprise white ink (or coating mixture) that contains any or any combination of the above referenced reflective or absorptive material. The reflective (or absorptive) layers are formed with sufficient thickness to either scatter radiation back toward the detector or absorb the radiation. The indicia 58 and 60 are placed on layers 54 and 56 respectively.

In an exemplary embodiment, the tape structure 50 is applied to a leading edge of a sheet of print medium, such as a transparent polyester sheet, and the indicia provide data regarding characteristics of the print medium. For example, the tape structure can be applied to the sheet by an adhesive layer. The reflective (or absorptive) coating layers block the leakage of fluorescing radiation through the tape when indicia are radiated by a light source as shown in FIG. 1.

Figure 4:
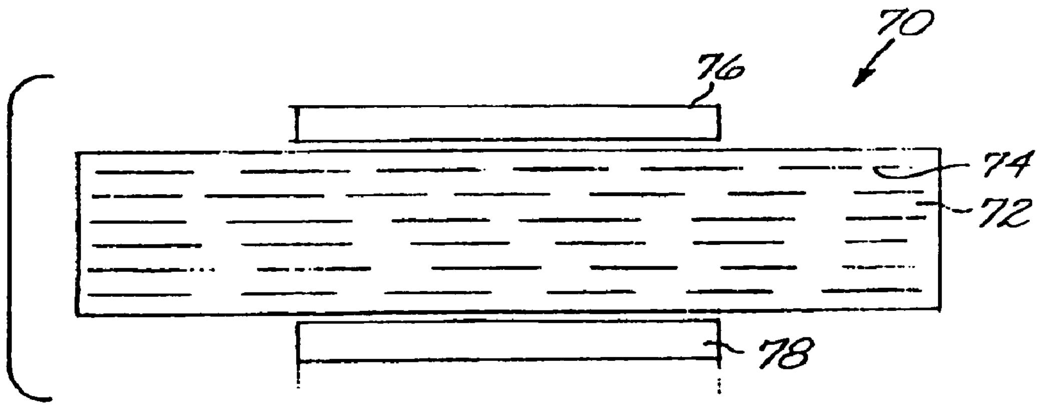
FIG. 4 is a diagrammatic side view of a print medium, wherein reflective (or absorptive) radiation blocking agents have been added to the paper during manufacturing.

The reflective (or absorptive) radiation blocking agents of the embodiment of FIG. 3 could alternatively be added to the tape during manufacturing, instead of or in addition to layers formed on the sheet. Such an embodiment is shown in FIG. 4, illustrating a tape structure 70 wherein the blocking agents 74 are added to the tape 72, and then the indicia 76 and 78 are placed on the top and the bottom of the tape 70.

Figure 5:
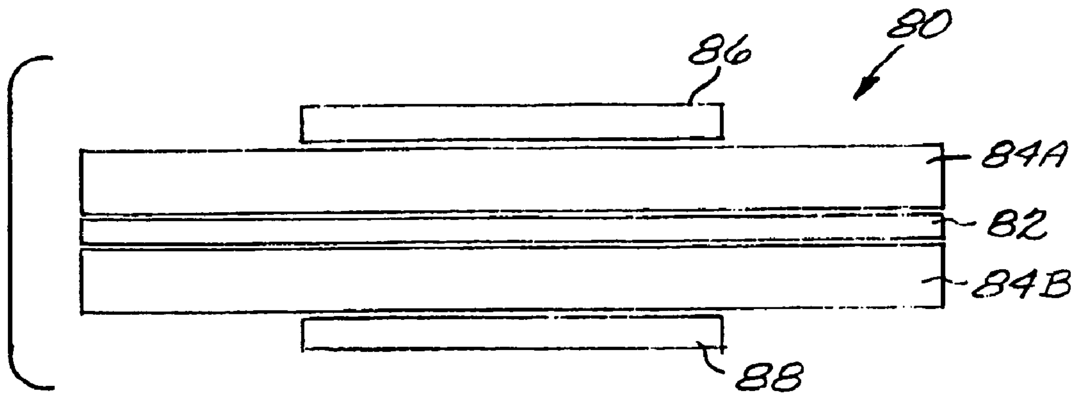
FIG. 5 is a diagrammatic side view of a print medium in accordance with another embodiment of the invention, wherein a thin layer of a metal foil is sandwiched between two layers of paper or film, and respective indicia are formed on the paper or film layers.
Figure 6:
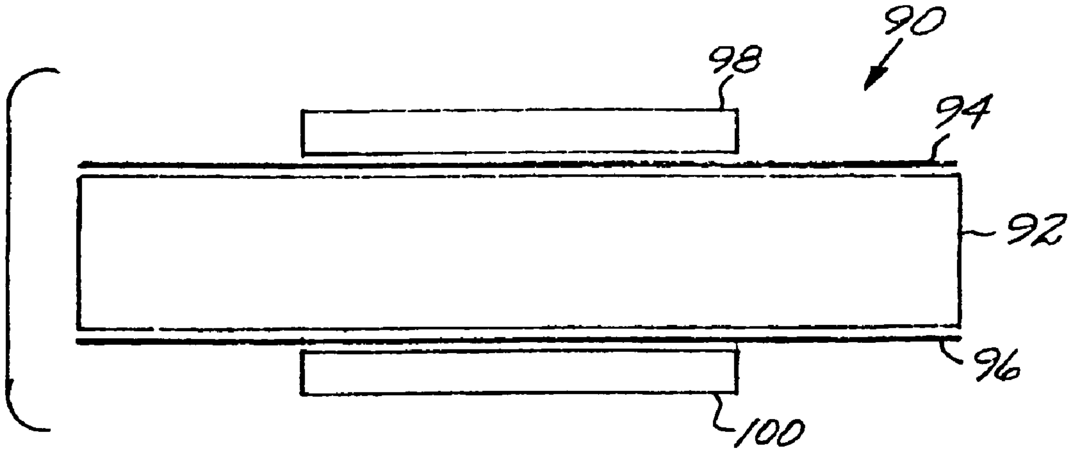
FIG. 6 is a diagrammatic side view illustrating another embodiment of the invention, wherein a sheet of a print medium is laminated on both sides with black ink, paint or carbon to provide a black background to prevent leakage of radiation.
Figure 7:
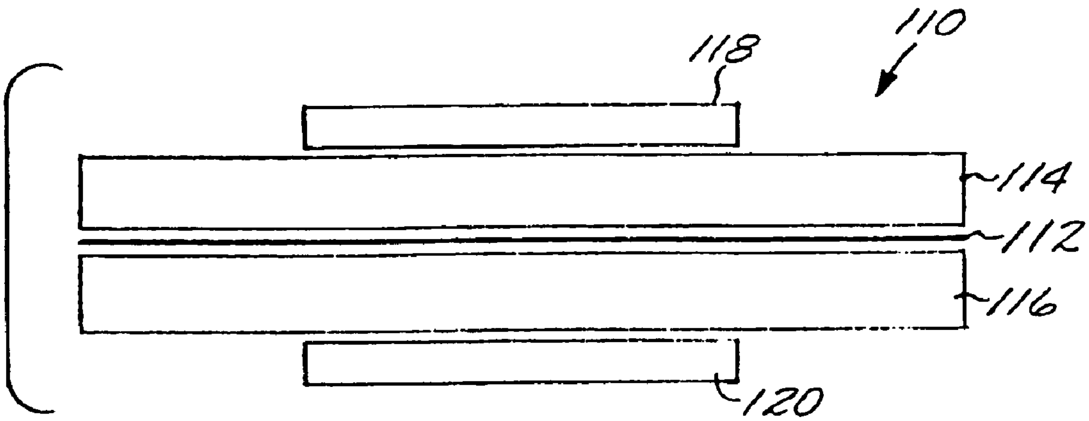
FIG. 7 illustrates an embodiment wherein a thin layer of a black background material is sandwiched between two layers of paper, and indicia are placed on the top layer and bottom layer.

Another embodiment for preventing radiation leakage through an indicia-bearing tape is illustrated in FIG. 5. Here, the structure 80 includes a thin (sufficient to provide a resistance of 1 ohm per square or sufficiently thick to scatter radiation) layer 82 of a metal (foil) such as aluminum sandwiched between two layers 84A and 84B of paper. Respective indicia 86 and 88 are formed on the paper layers. When used in an indicia detecting system as shown in FIG. 1, the aluminum layer 82 reflects the leaked fluorescing radiation back to the direction of the detector. It should be noted that the aluminum layer also reflects some of the emitted radiation toward the direction of indicia, thus increasing the fluorescing signals.

Another technique is to use a black background to prevent leakage of radiation. The tape structure 90 illustrated in FIG. 6 includes tape 90 laminated on both sides with black ink (or paint or carbon) 94 and 96. The thickness of the black background is sufficient enough to prevent radiation leakage. The indicia 98 and 100 are then placed on the surface of the respective black backgrounds 94 and 96. In this technique, the black background absorbs unreflected radiation, and prevents scrambling of fluorescing radiation from two opposite sides of the paper. Alternatively, a tape structure 110 shown in FIG. 7 includes a thin (sufficiently thick enough to prevent leakage) layer 112 of black background between two layers 114 and 116 of tape material. The indicia 118 and 120 are then placed on the top layer 114 and bottom layer 116.

Figure 8:
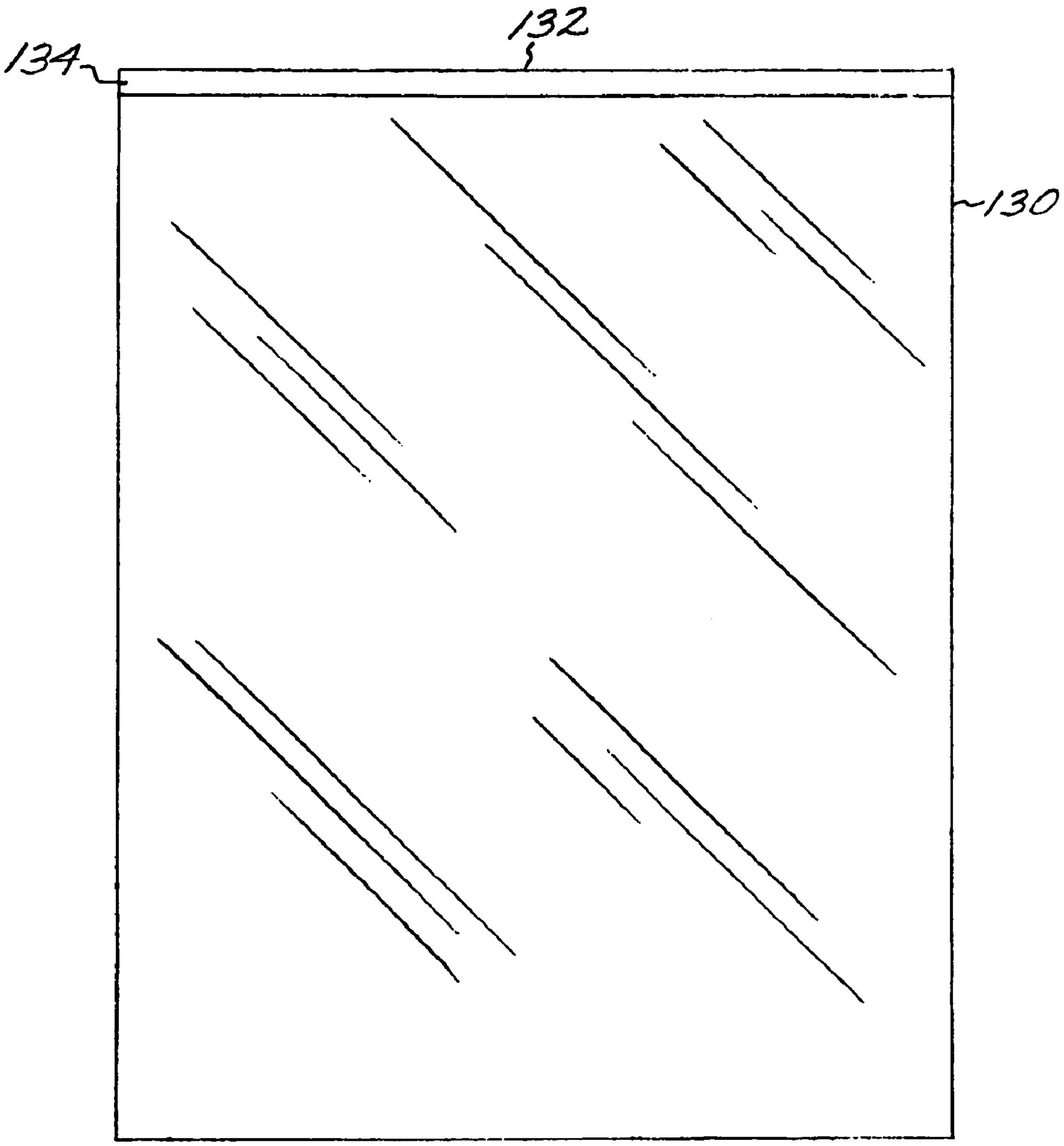
FIG. 8 is a top view illustrating a sheet of transparent film print medium having applied to a leading edge a strip of indicia-bearing tape.

In an exemplary embodiment, the tape structure is prefabricated in a roll of tape material, from which are cut or slit respective tape strips in a desired width. The tape strips are then applied to respective sheets of the print media, e.g. along the leading edge. This is shown in FIG. 8, wherein a sheet 130 of a print medium such as a clear polyester used for overhead projection has applied along its leading edge 132 a strip 134 of a tape structure as illustrated in any of FIGS. 3–7, with indicia formed on each side of the tape. A layer of adhesive can be used to adhere the strip to the print media. Since the strip is of narrow width, the indicia on the respective sides will overlap in a direction normal to the sheet in a typical application. In such an exemplary application, the indicia on each side can extend the full length of the strip to avoid the need to register the position of the indicia relative to the sensor.

The indicia is applied to the tape structure by ink jet printing, or by other printing processes such as flexographic, letterpress, rotogravure, etc.

In an alternate embodiment, the tape structure is not employed, and the indicia are applied to at least one surface of the print medium. The reflective or absorptive material can be applied directly to a portion of the print medium, and the indicia printed onto the reflective or absorptive material, in a manner similar to that shown in FIG. 3, but with the print medium replacing the tape. Other alternative arrangements are contemplated, wherein the print medium replaces the tape material described in respective FIGS. 4–7.

Figure 9:
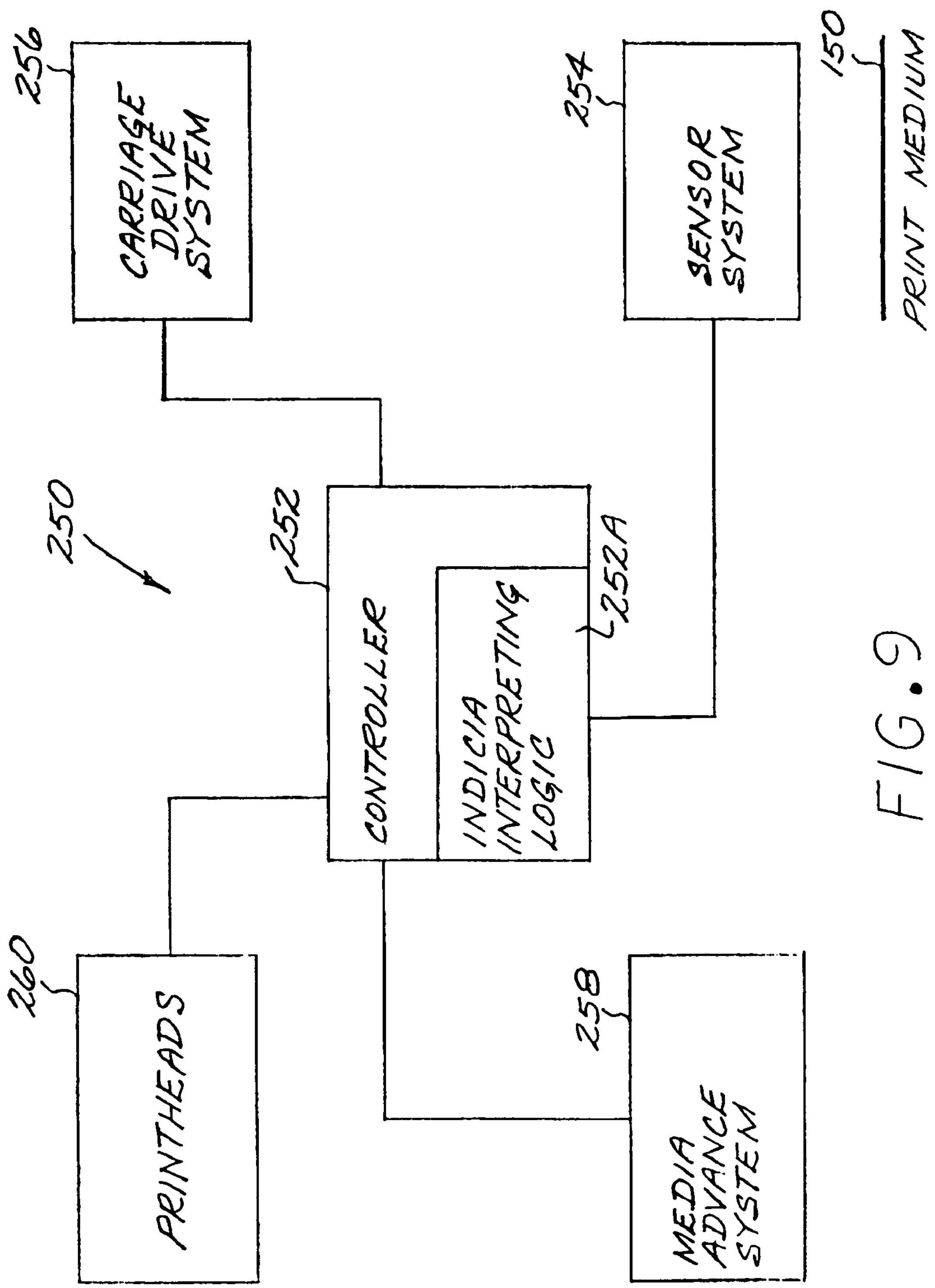
FIG. 9 is a simplified block diagram of a printer system with a sensor capable of reading the indicia and with indicia interpreting logic capable of interpreting the indicia and controlling printer operations.

An exemplary technique of reading indicia employs special fluorescent indicia placed on media with a special coding configuration, and a printer system with a sensor capable of reading the indicia and with indicia interpreting logic capable of interpreting the indicia and controlling printer operations. An exemplary printing system 250 is shown in simplified block diagram form in FIG. 9. Here, the system includes a controller 252, sensor system 254, carriage drive system 256, media advance system 258 and inkjet printheads 260. The controller in this exemplary embodiment is a microprocessor or ASIC, programmed to perform the functions to control elements shown in FIG. 9, in a manner known in the art. The controller 252 further is programmed to perform an indicia interpreting function 252A, in response to the sensor signals received from the sensor system 254, to read the data encoded by the indicia, and to adjust or set operating parameters of the printing system in response to the data for the particular medium 150. Thus, the controller 252 operates the media advance system to advance the medium 150 from an input location past the sensor 254. The sensor 254 is controlled to illuminate the medium with radiation of the appropriate wavelength range to excite the fluorescent ink forming the indicia, and to read the indicia in response to the excitation. The controller interprets this indicia using logic function 252A, and then can perform the printing on the medium, taking into account the information read from the indicia.

The above-referenced application entitled SYSTEM AND METHOD FOR CONTROLLING AN IMAGE TRANSFER DEVICE describes an image transfer device which can also use a print media in accordance with this invention.

Figure 10:
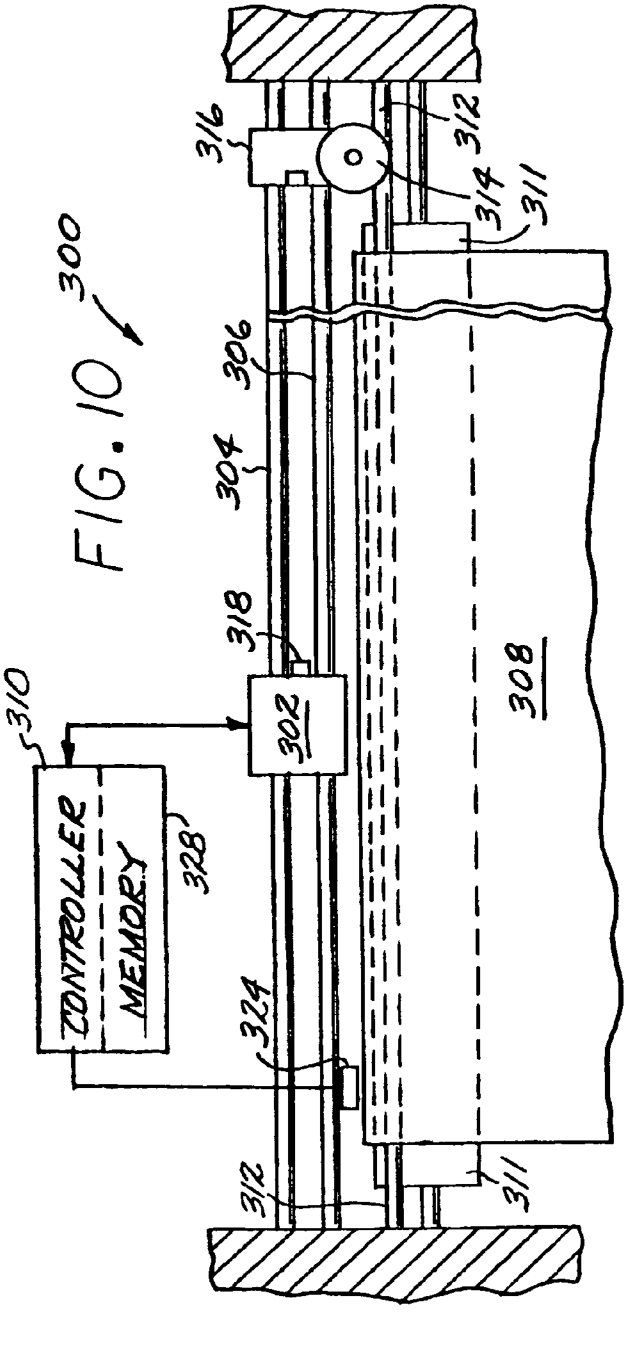
FIG. 10 is a schematic frontal view of a printer employing roll media, which printer is adapted to employ the invention hereof.
Figure 11:
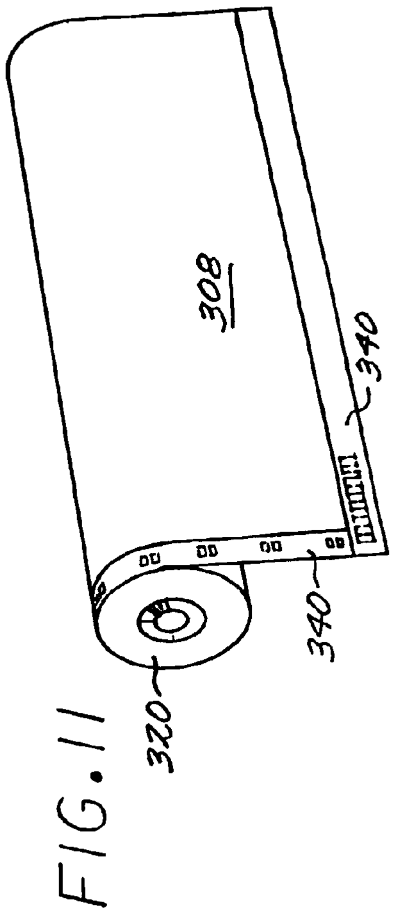
FIG. 11 is a perspective view of a roll of transparent film media for use with the printer of FIG. 10, which bears an indicia-bearing opaque tape in accordance with the invention.

While the invention has been described above in the context of an inkjet printer or image transfer device which utilizes media in sheet form, the invention can be applied to other types of printers, e.g. printers that employ roll media or folded media. FIGS. 10 and 11 illustrate an ink-jet plotter/printer which can use encoded transparent media as described above, but in roll form.

Referring to FIG. 10, printer 300 includes an inkjet printhead 302 which translates along a pair of slider bars 304 and 306 across the width of medium 308. In the known manner, a controller 310, by control signals causes printhead 302 to traverse along slider bars 304 and 306 and to eject ink droplets onto medium 308 which passes therebeneath. Media 308 passes over a roll 311 which positions media 308 accurately beneath printhead 302 for printing. Media 308 also passes over a cutter bar 312 which, in cooperation with a cutter 314 (similar to a pizza cutter), enables a transverse cut to be made across medium 308.

Cutter 314 is mounted on a carrier 316 which is also mounted for sliding movement along slider bars 304 and 306. When printhead 302 is moved into contact with carrier 316, a coupling mechanism 318 enables carrier 316 to move along with printhead 302 and to cut off a section of medium 308.

Referring to FIG. 11, a roll 320 of transparent medium 308 is shown, before mounting in printer 300. In an exemplary embodiment, the leading edge of medium 308 includes an indicia-bearing tape 340, which can take the form of any of the indicia-bearing tapes described above with respect to FIGS. 3–7. The indicia can identify, for example, the media type and size, and length. Alternatively, or additionally, the tape 340 can be disposed along a longitudinal edge of the medium 308, as also shown in FIG. 11. In this longitudinal orientation, the indicia can identify, in addition to the media type and size, the remaining length of medium on the roll. Thus, at spaced intervals along the length, the indicia can identify a remaining length. With this arrangement, the remaining length information is readable by the printer controller, even after the roll has been partially used, removed from the printer, and later reinstalled in the printer for subsequent use. The tape can be placed along both longitudinal edges of the medium 308 to provide mechanical stability on the roll.

Sensor 324 is positioned to read the coded indicia formed on tape 340 as it passes thereover. Data read from the coded indicia is fed to controller 310, which stores the data in a memory 328. Controller 310 then utilizes the data derived from the indicia to set parameters for control of printer 300, e.g. in accordance with the media type identified by the coded indicia.

Controller 310 further causes roller 311 to move the medium 308 a short distance so that the tape 340 passes the cutter bar 312. Printhead 302 is then moved to engage carrier 316. Thereafter, printhead 302 drags carrier 316 and cutter 314 across the medium 308, cutting off the portion of medium 308 carrying the tape 340. Normal printing/plotting then occurs. Alternatively, the tape can remain on the medium during printing, in an area which does not receive ink droplets.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A machine-readable indicia-bearing substrate structure, comprising:

a substrate having a first surface and a second surface;

a first information bearing indicia defined by a fluorescent material positioned adjacent to the first surface;

a second information bearing indicia defined by a fluorescent material positioned adjacent to the second surface; and means for preventing interference between a first fluorescing signal emitted by the first indicia and a second fluorescing signal emitted by the second indicia during a detection process for reading information from said first indicia or said second indicia, in which detection process the substrate structure is illuminated by illumination energy of a predetermined wavelength or wavelength range which causes said fluorescent material to fluoresce, said means including a reflective layer structure positioned between the first indicia and the second indicia, said reflective layer structure having sufficient thickness and opaqueness to prevent passage therethrough of said first fluorescing signal and said second fluorescing signal and to reflect said illumination energy;

wherein the substrate is a print medium, and the indicia are applied to a portion of the print medium which does not receive printed components of an image during a printing process; and wherein the substrate comprises first and second thin layers of a substrate material, and said reflective layer structure includes a reflective layer sandwiched between the first thin layer and the second thin layer.

2. A print medium encoded with information bearing indicia, comprising:

a layer of a print medium;

an indicia-bearing tape structure adhered to said layer of the print medium, said tape structure comprising:

a tape substrate having a first surface and a second surface;

a first information bearing indicia defined by a fluorescent material positioned adjacent the first surface;

a second information bearing indicia defined by a fluorescent material positioned adjacent the second surface; and a reflective barrier structure for preventing interference between a first fluorescing signal emitted by the first indicia and a second fluorescing signal emitted by the second indicia during a detection process in which the substrate is illuminated by illumination energy of a predetermined wavelength or wavelength range which causes said fluorescent material to fluoresce, said reflective barrier structure of sufficient opacity and reflectiveness to prevent passage therethrough of said first fluorescing signal and said second fluorescing signal and to reflect said illumination energy.

3. The print medium of claim 2 wherein the reflective barrier structure includes a thin metal foil layer positioned between the first indicia and the second indicia.

4. The print medium of claim 2 wherein the reflective barrier structure includes a reflective layer positioned between the first and second indicia.

5. The print medium of claim 2 wherein the reflective barrier structure comprises one or more of the following materials:

Titanium (IV) Oxide (TiO2), Zinc Oxide (ZnO), Zirconium (IV) Oxide (Zro2), aluminum oxide (Al2O3), aluminum oxide hydroxide (AlO(OH)), aluminum trihydroxide (Al(OH)3).

6. The print medium of claim 2 wherein the reflective barrier structure includes:

a first layer of a reflective disposed on the first surface of the tape substrate, the first indicia disposed on an outer surface of the first layer; and a second layer of a reflective disposed on the second surface of the tape substrate, the second indicia disposed on an outer surface of the second layer.

7. The print medium of claim 2 wherein the reflective barrier structure includes reflective radiation blocking materials dispersed within the tape substrate.

8. The print medium of claim 2 wherein the tape substrate comprises first and second thin layers of a tape material, and the reflective barrier structure includes a reflective layer sandwiched between the first thin layer and the second thin layer.

9. The print medium of claim 2 wherein the tape substrate is fabricated from a material selected from the group consisting of:

paper, polyester, polyethylene and polystyrene.

10. The print medium of claim 2 wherein said fluorescent material is a material which fluoresces energy at a wavelength within the spectral region between 200 and 1100 nanometers upon excitation by excitation radiation.

11. The print medium of claim 2 wherein the first indicia and the second indicia are arranged in an overlapping relationship.

12. The print medium of claim 2 wherein the layer of the print medium is a layer of a transparent or clear print material.

13. The print medium of claim 2 wherein the layer of the print medium is in sheet form.

14. The print medium of claim 2 wherein the layer of the print medium is in roll form.

* * * * *